United States Patent
Giovinazzo

(10) Patent No.: US 7,399,383 B2
(45) Date of Patent: Jul. 15, 2008

(54) VIBRATORY CONVEYOR WITH NON-BIASED OSCILLATION

(75) Inventor: Frank Giovinazzo, Cicero, NY (US)

(73) Assignee: Roboshop, Inc., Syracuse, NY (US)

( * ) Notice: Subject to any disclaimer, the term of this patent is extended or adjusted under 35 U.S.C. 154(b) by 98 days.

(21) Appl. No.: 11/487,194

(22) Filed: Jul. 14, 2006

(65) Prior Publication Data

US 2007/0017784 A1    Jan. 25, 2007

Related U.S. Application Data

(60) Provisional application No. 60/702,102, filed on Jul. 22, 2005.

(51) Int. Cl.
*B65G 27/00* (2006.01)
*B65G 27/34* (2006.01)

(52) U.S. Cl. .................. 196/755; 198/765; 198/771

(58) Field of Classification Search .................. 198/755, 198/759, 765, 769, 771
See application file for complete search history.

(56) References Cited

U.S. PATENT DOCUMENTS

| 3,667,590 | A |   | 6/1972  | Mead     | 198/220 BA |
|-----------|---|---|---------|----------|------------|
| 3,789,711 | A |   | 2/1974  | Mead     | 83/61      |
| 3,835,983 | A |   | 9/1974  | Horii    | 198/220 BA |
| 3,841,471 | A | * | 10/1974 | Mead     | 198/383    |
| 3,964,601 | A |   | 6/1976  | Armstrong| 198/220 BA |
| 3,995,733 | A |   | 12/1976 | Mead     | 198/766    |
| 4,037,710 | A | * | 7/1977  | Brutcher | 198/443    |
| 4,050,572 | A | * | 9/1977  | Armstrong| 198/437    |
| 4,068,029 | A |   | 1/1978  | Armstrong| 126/89     |
| 4,444,303 | A | * | 4/1984  | Burgess, Jr. | 198/346.1 |
| 4,449,626 | A | * | 5/1984  | Dodd     | 198/765    |
| 4,844,236 | A |   | 7/1989  | Kraus    | 198/690.2  |
| 5,085,314 | A |   | 2/1992  | Higson   | 198/722    |
| 5,147,031 | A | * | 9/1992  | Carpenter| 198/750.7  |
| 5,301,791 | A |   | 4/1994  | Shampine | 198/391    |
| 6,029,796 | A |   | 2/2000  | Musschoot| 198/753    |
| 6,116,409 | A |   | 9/2000  | Yokajty et al. | 198/771 |

\* cited by examiner

*Primary Examiner*—Mark A Deuble
(74) *Attorney, Agent, or Firm*—Bernhard P. Molldrem, Jr.

(57) ABSTRACT

A vibratory conveyor has a bed or trough that carries the workpieces, and supported above a base plate. A vibratory motor employs linear bearing to provide vibratory that is kept in the plane of the conveyor bed. A directional fabric material lying on the trough is smooth or slippery in one direction but grips the workpieces in the opposite direction. The vibratory motor keeps the motion in the back and forth direction, with almost no vertical component, for quieter operation and without shaking that can damage delicate workpieces. The direction of motion can be selected by orienting the fabric.

3 Claims, 6 Drawing Sheets

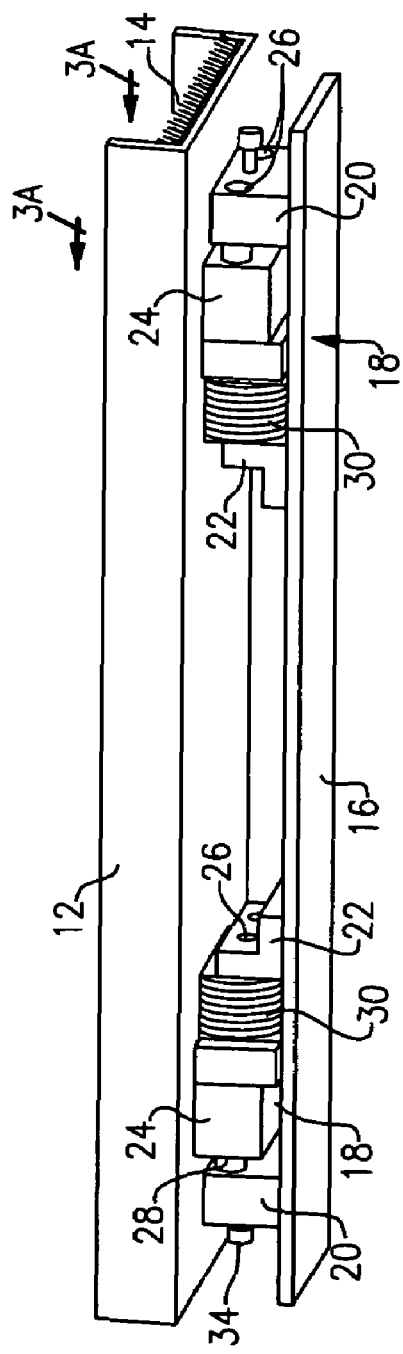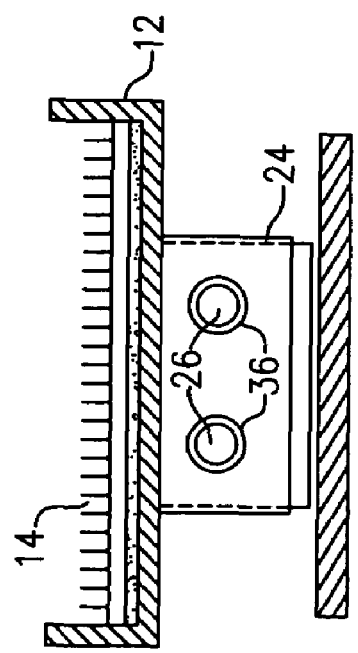

VIBRATORY CONVEYOR WITH NON-BIASED OSCILLATION

Applicant claims priority under 35 U.S.C. 119(e) of Provisional Appln. 60/702,102, filed Jul. 22, 2005.

BACKGROUND OF THE INVENTION

This invention concerns vibratory conveyors, which may be used for conveying articles or parts from one location to another, or as a parts feeder for bringing articles or parts to a given process step, or as an orientation device for orienting parts so that a process step may be carried out more efficiently.

The invention is more concerned with devices which use vibration to convey and/or orient parts on a reciprocating trough or platform.

In vibratory conveyors, there is a bed or trough that carries the workpieces, a vibratory motor that provides vibratory motion. Conventional unidirectional vibratory drive motors produce a jumpy or jerky motion with a significant vertical component. These miss out on the advantages possible with a more-or-less harmonic vibratory motion, where motion is confined to the horizontal plane, i.e., the plane of the conveyor bed.

Vibratory feeders have been used for many years and there are many different methods used to impart the vibration that leads to workpiece movement and orientation. These methods involve movement in two directions in respect to the conveyor trough: typically with both a longitudinal component and a vertical component, or a longitudinal component and a horizontal component. In either case, there is a jerky ratcheting motion, with the workpieces being thrown forward and upward or forward and sideways by the reciprocating trough for moving the parts with each vibration. These systems are loud and somewhat inefficient, and produce shaking which limits their usefulness to handling of tough durable workpieces.

Previously, vibratory motors for these conveyors have been unable to provide motion only in a back and forth direction, or to provide the vibrations without the rough shaking and jerking that can damage the more delicate parts and components on the assembly line.

OBJECTS AND SUMMARY OF THE INVENTION

Accordingly, it is an object for a vibratory conveyor to impart motion without encountering the drawbacks of the prior art.

It is a more specific object for a vibratory conveyor to employ a directional fabric material that is smooth or slippery in one direction but grips the workpieces in the opposite direction, where it is the direction of the fabric, not the direction of the motor-driven vibrations, that controls the direction of motion of the parts.

It is another object for a vibratory drive to provide quiet, efficient operation with vibrations that are confined to the plane of the trough, without significant components in the vertical direction, i.e., perpendicular to the trough.

In an embodiment of the present invention, the trough is oscillated with a linear, longitudinal motion. The oscillation is equal in both directions and thus neutral, and does not itself cause the parts or workpieces to move. Also, there is no vertical vibratory component; only a horizontal vibratory component is imparted onto the trough. The conveyance of the parts is accomplished by means of a biased material that covers the conveying trough. This material can, in some favorable embodiments, be a brush or carpet type of material. The material can be any material having a suitable upper surface with a "grain" or direction preference, i.e., having a higher friction when stroked in one direction and a lower friction when stroked in the return direction. The orientation of the fabric or other grainy material on the conveying trough will determine the direction of conveyance.

The specific material is not critical, except that it must favor moving the articles in a given direction. Some convenient directional fabrics can have a brush-like surface, i.e., surface fibers or hairs that bend or lean in one direction, or may even have a more-or-less scaly surface, like snake skin or fish skin. The vibratory motor keeps the motion in the back and forth direction, with almost no vertical component, instead of the conventional jerky upward motion that is typical of conventional vibratory conveyor drives. This makes for quieter operation and is less likely to produce shaking that can damage delicate workpieces.

The direction of motion can be selected by orienting the fabric, and it is possible to have a number of strips of the material oriented in different directions so that the parts can be conveyed back and forth. This lets the conveyor be used for different tasks, such as buffering between process steps, or orienting the parts.

Brushlon ™ is one candidate material, but other materials can be used, so long as the part slips on the material in one direction and catches the part in the other direction. With Brushlon or an equivalent fiber material, the slanted fibers impose a vertical component of motion to the parts being conveyed, although the trough or conveyor does not have a vertical motion component. This small vertical component comes from the fibers tending to bend downward and spring upward with the vibrations of the conveyor.

The invention moves parts in any direction on the same conveying platform.

A conveyor or part feeder can be constructed which moves parts in several directions simultaneously by orienting the surface material accordingly. That is, parts or workpieces can follow a back and forth raster pattern, with strips of the biased material oriented alternately in one direction and then the other.

The vibratory drive motor for this is designed to produce planar motion, i.e., without the vertical component that is produced by conventional vibratory drives. Consequently, the vibratory drive employed in this invention is quieter, and can be easily adjusted in force and frequency by simple rheostat controls.

The conveyors of this invention can replace conventional belt-type conveyors while providing advantages in versatility, reliability reduction in floor space requirements, gentler part handling, and costs. The linear flow motion technology offers unmatched part handling capabilities, with a rugged, low profile, and quiet part handling system.

The part motion direction or feed direction can be changed quickly and easily, simply by changing the direction of the biased material. The strips of biased material may be secured with Velcro® or a similar hook-and-loop system. The low profile of the conveyors provides tight product transfers and the ability to fit into space-constrained areas. The brush-like material provides additional benefits in the handling of polished or fragile parts, but can easily handle standard parts also. These vibratory conveyors can be made in a multitude of widths and lengths, and can be easily interconnected for longer length requirements.

The linear flow motion employed in this invention eliminates the vertical motion component that is inherent in standard vibratory conveying systems. The conveying surface is reciprocated in a flat, linear motion, reducing noise and removing unwanted vibration transfer both to the conveyed part and to any connected equipment. The bias direction of the brush or similar material controls the direction of part movement. The technology offers the unique capability of a full 180° direction reversal, without additional components such as belts, shafts, or pulleys. Because there is no belt involved, reversal of parts direction is simple to accomplish. The operator can simply peel back the brush-like material from the hook-and-loop backing and pull it off, and then lay it in the opposite direction. Maintenance is also simple. The brushlike material can be cleaned by vacuuming, or it may be removed and washed. The vibratory strips are favorably formed of a polyethylene material with a rubber backing, which is water and solvent resistant.

Many applications for the vibratory conveyor of the invention include accumulation, assembly, automotive bar code scanning, bulk product movement, buffering, clean room, cosmetics, curing, diverting, electronic component automation, foods handling, higher temperature applications, incline or decline movement, inspection, labeling machine integration, materials handling, marking, medical, metal stamping, OEM integration, packaging, parts separation, plastic moulding, robotic integration, scanning, weighing, and workcell applications.

BRIEF DESCRIPTION OF THE DRAWING

FIG. 3 is another perspective thereof.

FIG. 3A is a section view taken at 3A-3A of FIG. 3.

DETAILED DESCRIPTION OF THE PREFERRED EMBODIMENT(S)

Figure 1:
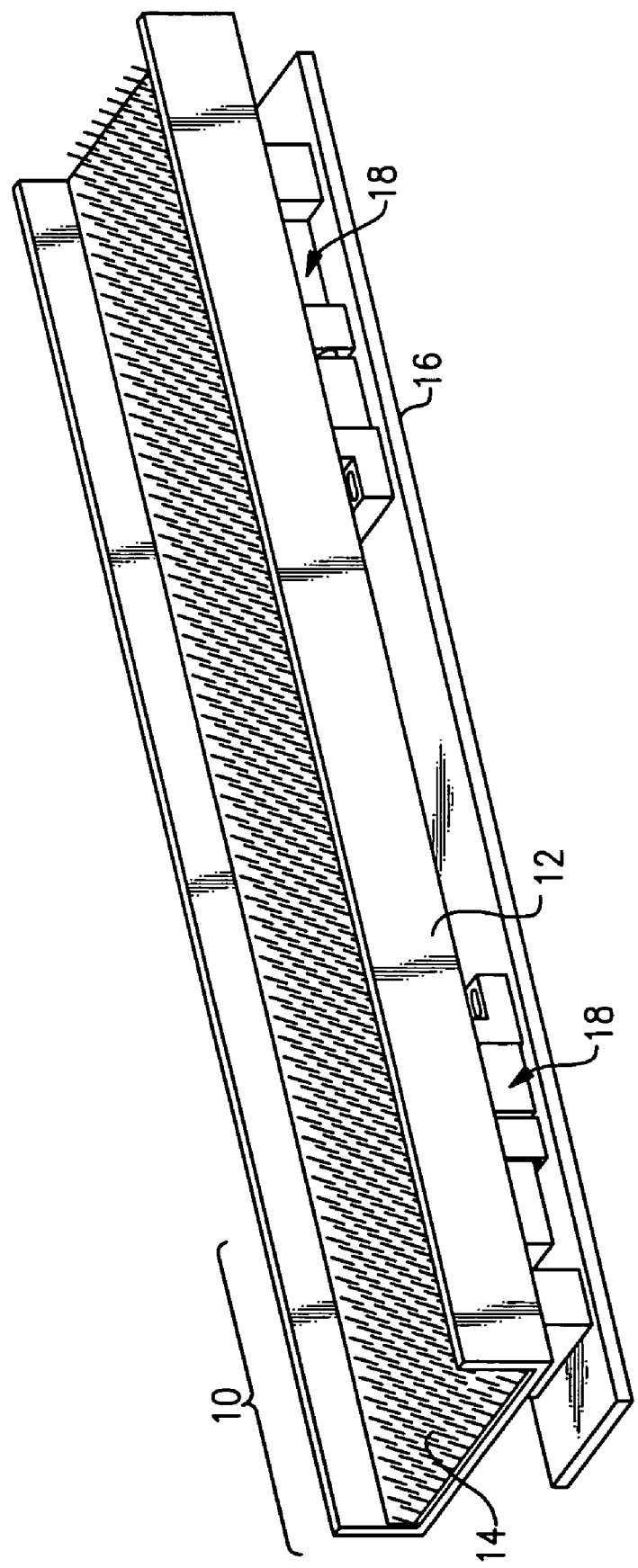
FIG. 1 is a perspective view of a portion of a vibratory conveyor of this invention.

With reference to the Drawing, and initially to FIG. 1, a linear vibratory conveyor 10 has a trough 12 containing a brushlike linear fabric material 14 which is conveying material that the parts are placed upon. A base plate 16 beneath the trough 12 is affixed onto a table, floor or other support, and a linear vibratory drive motor, or in this embodiment, a pair of drive motors 18, is mounted on the base plate 16, with the tray or trough 12 being supported on the drive motors 18.

The trough 12 oscillates longitudinally, that is, back and forth in its own plane, so that there is no significant component of vertical motion of the trough. Here the term "vertical" means in the direction normal to the plane of the trough, which can be inclined somewhat. The oscillation is uniform, and can be sinusoidal or harmonic, so that the only factor influencing the conveyance is the bias of the surface material 14. The conveying material 14 is biased so that it is smooth in one direction but has friction if parts move opposing the grain. In a favorable embodiment this material 14 can be a brushlike material with hairs or fibers that are bent at an angle in one direction. Then by orienting the surface in a particular direction, the workpieces or parts will be conveyed along the surface of the material 14 following the orientation of the hairs or fibers.

Figure 2:
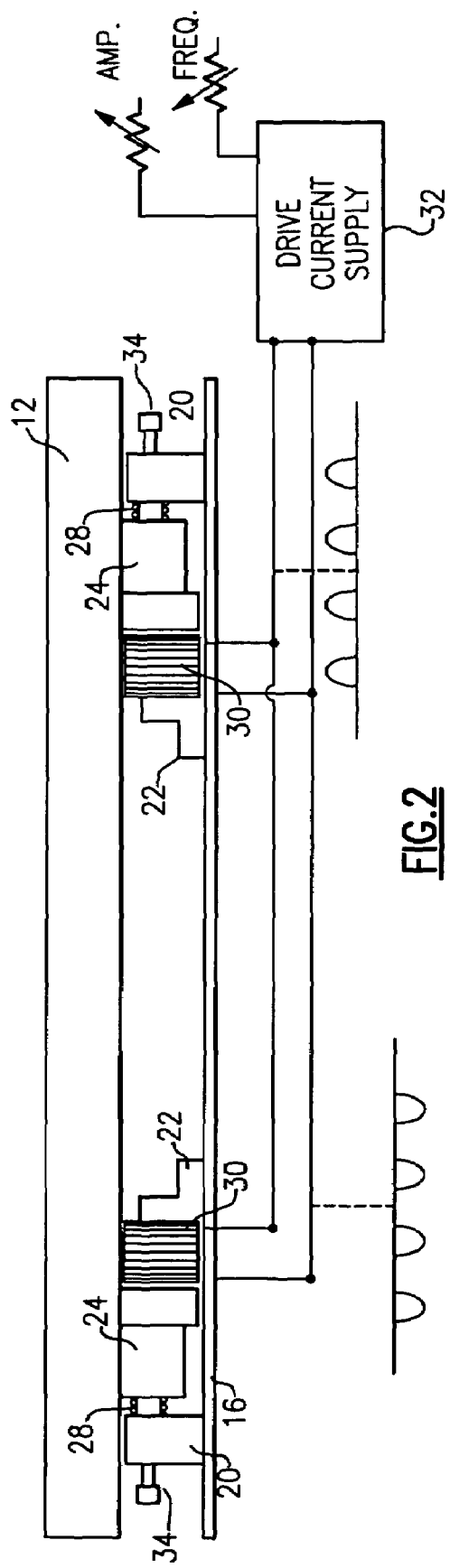
FIG. 2 is a side elevation thereof.

FIG. 2 and FIG. 3 better illustrate the vibratory drive motor or motors 18. Here, there is a pair of drive motors 18, but a single vibratory drive motor 18 would be sufficient in may applications. As shown here, there are mounting blocks 20 and 22 that are affixed onto the base plate 16. These are spaced apart, and an upper mounting block 24 is situated between them, and mounts to the tray or trough 12. Here, a pair of horizontal posts or shafts 26 are affixed in the lower blocks 20 and 22 or each linear vibratory motor 18, and extend between those blocks. These posts or shafts 26 pass through linear bearings in the upper mounting block 24, permitting sliding motion of the block 24 only in the back and forth direction, i.e., along the trough X-axis, and restricting motion in respect to the Y-axis (transverse) and Z-axis (vertical). Linear coil springs 28 are situated between the posts 26 and between the mounting block 20 and the mounting block 24, and electromagnetic coils 30 are provided for each linear vibratory drive motor 18. In some motors 18, there can be two or more springs 28.

The mounting blocks 20, 22, 24 hold the trough and linear bearings to provide the longitudinal oscillation. The springs 28 keep the trough centered, and provide the recoil when the electromagnets 30 pull the trough assembly in opposing directions. The tension of the springs 28 along with the mass and inertia of the assembly determine the resonant frequency of the longitudinal oscillation.

Only a single electromagnet coil 30 is needed, but multiple coils may be used to provide greater amplitude of oscillation. The electromagnets provide the force that sets the assembly into linear longitudinal oscillation. The springs 28 on the opposite end compress when the electromagnet coil 30 energizes, and then provide the return force when the coil is de-energized.

In FIG. 2, a drive current supply is shown schematically, providing the electrical current waveforms for energizing the electromagnet coils 30. This drive current supply 30 has simple rheostat controls for amplitude and frequency of the drive current. In favorable embodiments, the drive current can be standard sinusoidal (e.g., half-wave) waveforms. However, in some applications, the waveforms may be shaped, e.g., as illustrated. The current supply 32 can instead be a digital signal synthesizer, which can be controlled from a computer console (not shown).

Also shown here is an adjustment screw 34, which permits adjustment of the tuning of the system vibratory frequency, e.g., by adjustment of spring force. There is favorably a layer of a Velcro® type material on this, so that it can be removably laid down on the trough 12, which is provided with the mating type of Velcro® material.

FIG. 3A shows the linear bearings in which the pair of posts or shafts 26 slidably support the bearing block 24 on which the trough 12 is mounted. The bearings may be of any design or material that provides low friction guidance for the horizontal oscillation of the trough. In one possible embodiment, the bearings may comprise plastic sleeves 36, that can be formed of a resin that has a fill of a lubricant material. The sleeves 36 are disposed within cylindrical passageways in the block 24 and the shafts 26 ride in these sleeves. The pair of shafts 26 keep the motion confined to the axial direction of the shafts, and minimize or eliminate any twisting motion of the trough 12. This construction makes the conveyor efficient, ans also keeps the sound level to a comfortable level.

FIG. 3 also shows detail of the conveying material 14, with hairs or fibers bent in the conveying direction.

Figure 4:
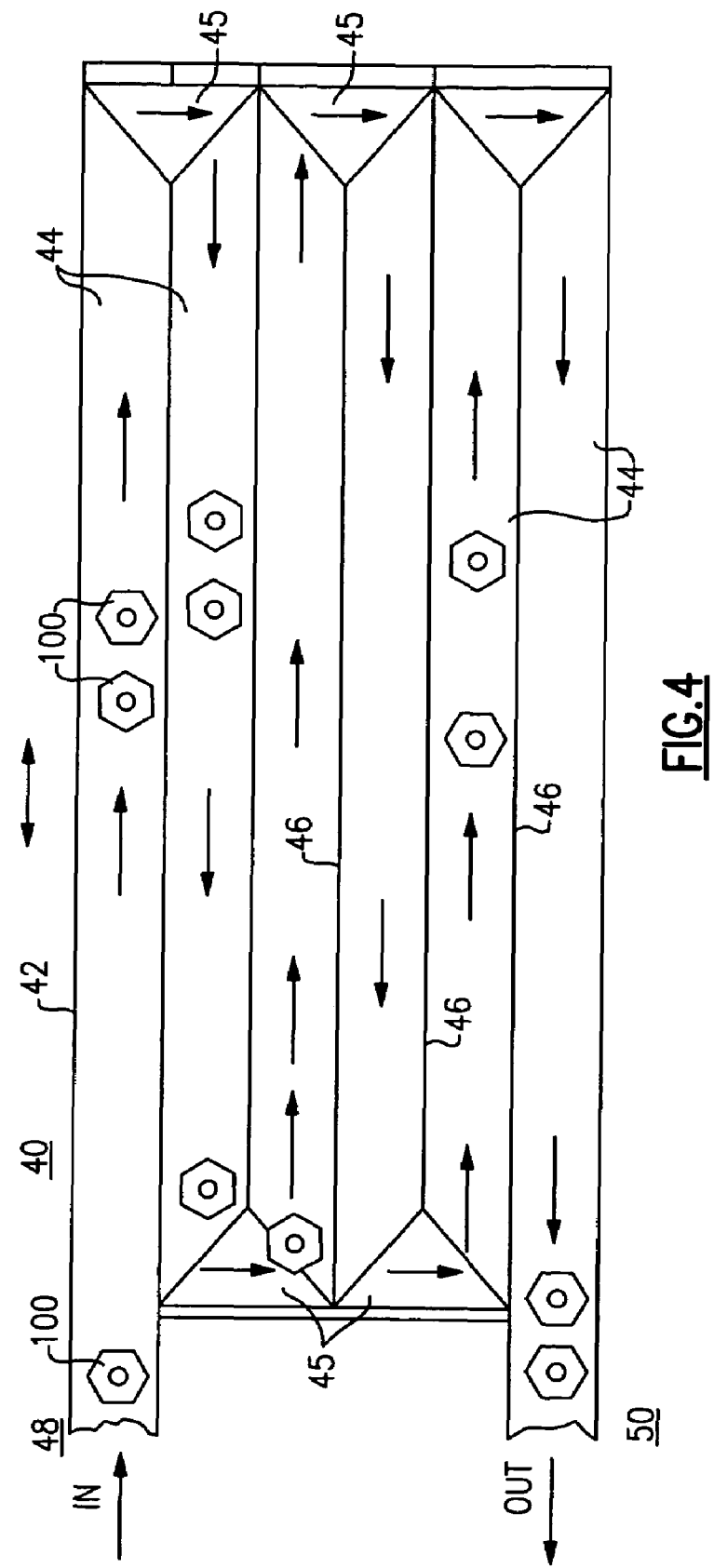
FIG. 4 is a plan view of a vibratory feeder of this invention configured for back and forth transport of parts and workpieces.

FIG. 4 illustrates one of many practical applications of the invention, i.e., a conveyor arrangement 40 which causes the workpieces 100 to follow a back and forth raster pattern. In this case, the tray or trough 42 has a number of strips 44 of the directional material with the bias direction oriented alternately, i.e., first to the right, then to the left, and so on. The direction of travel of the workpieces alternates from one strip to the next, in the direction shown in arrows in FIG. 4. At the end of each row there are end blocks 45 of directional material with the bias direction oriented in the transverse direction to assist the workpieces 100 in going from the end of one row to the beginning of the next row. Internal fences or barriers 46 separate the rows from one another so the parts or workpieces 100 stay on the row until the end. The small amount of parasitic vibration in the transverse direction that exists at the end of each row of the tray 42 is sufficient for the end blocks 45 of directional fabric to move the parts from each row to the next row. Here the workpieces enter the conveyor 40 at an inlet 48, and after being conveyed back and forth the workpieces 100 exit the conveyor at an outlet 50. This arrangement can serve as a parts buffer system for holding a large number of parts or workpieces, and delivering them at a uniform rate to the outlet 50. The conveyor 40 can be used for matching delivery speed between process steps, or can be used to allow for a cure time. The back and forth pattern means that the conveyor can fit into a restricted factory space which would have been difficult for a standard vibratory conveyor which would be restricted to one direction of motion.

Figure 5:
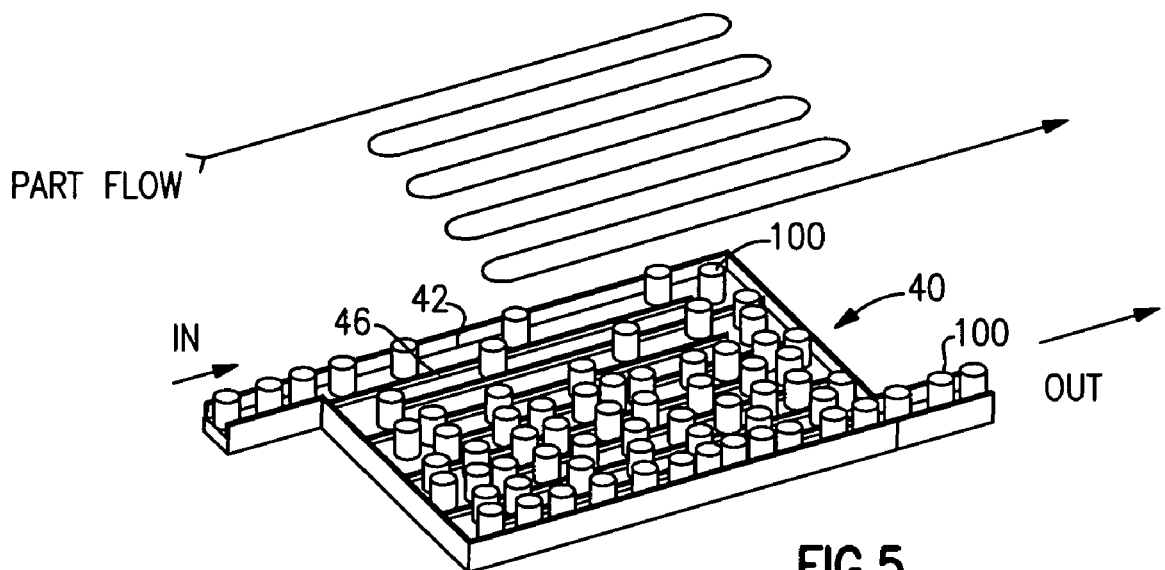
FIG. 5 is a perspective view of the vibratory feeder of this invention.

FIG. 5 shows an example of the back-and-forth conveyor arrangement 40, here in a perspective view. The parts flow, illustrated graphically above the unit, is from the inlet 48 and then along the rows in succession until the parts 100 reach the outlet 50. In this configuration, the conveyor arrangement can serve as an accumulator or as a parts buffer.

The linear vibratory motion can be carried out without undue shaking which can damage some more delicate parts or workpieces. Also, the linear vibratory motion used in this invention is much quieter than conventional vibratory conveyors, keeping sound levels at safe levels, and operating at greater efficiency.

Figure 6:
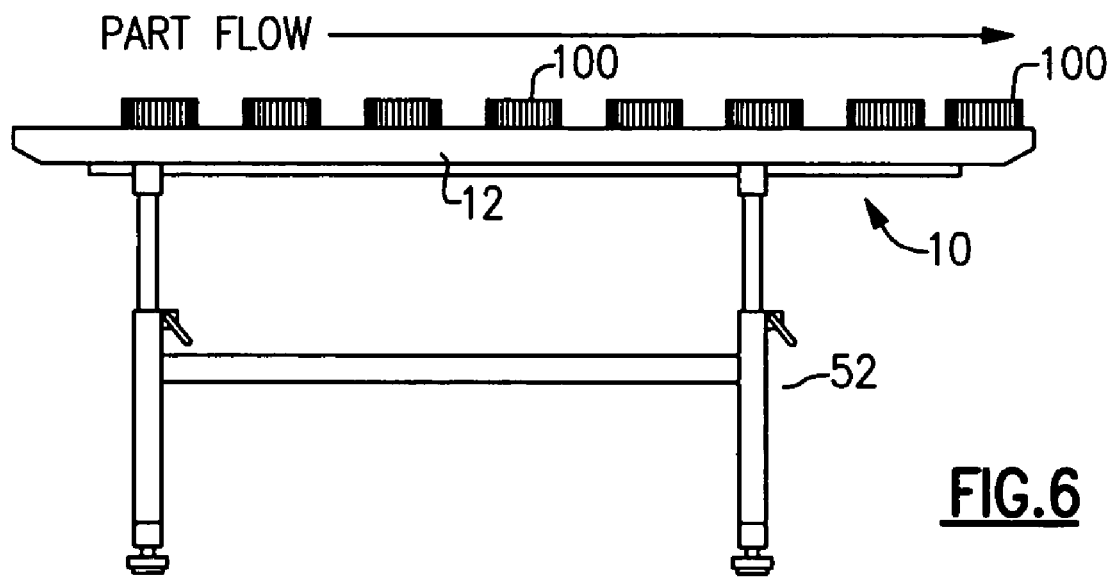
FIGS. 6 and 7 are perspective views of a vibratory conveyor adjustable for level or incline use.
Figure 7:
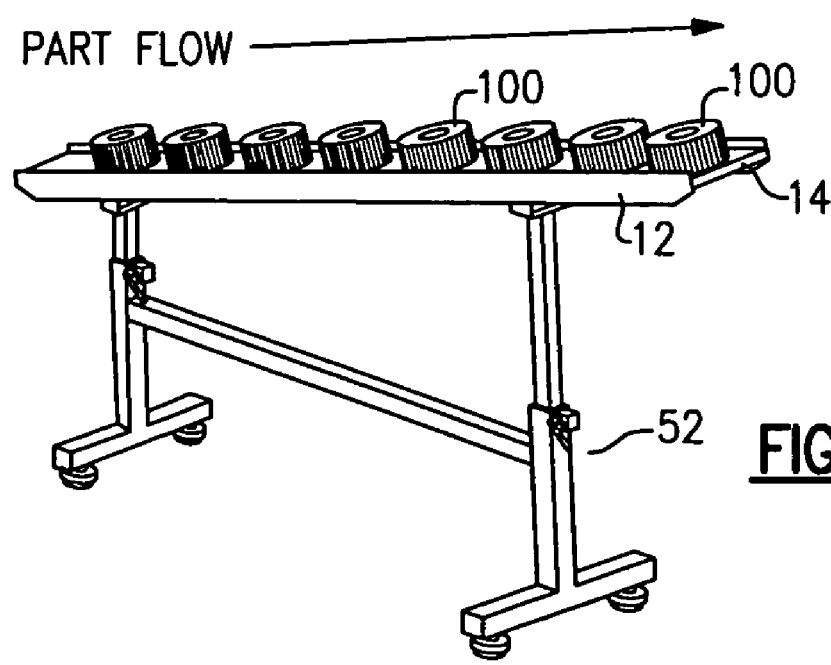

FIGS. 6 and 7 show the conveyor with the tray or trough 12 supported on an adjustable frame 52, with the direction of transport of the parts 100 being to the right in the drawing, as indicated by arrow. FIG. 6 shows the conveyor 10 configured for level or horizontal transport. In FIG. 7, one leg of the frame 52 is extended upwards, so that the parts 100 are carried up an incline. This makes it simple to match process stations that are on different levels.

Figure 8:
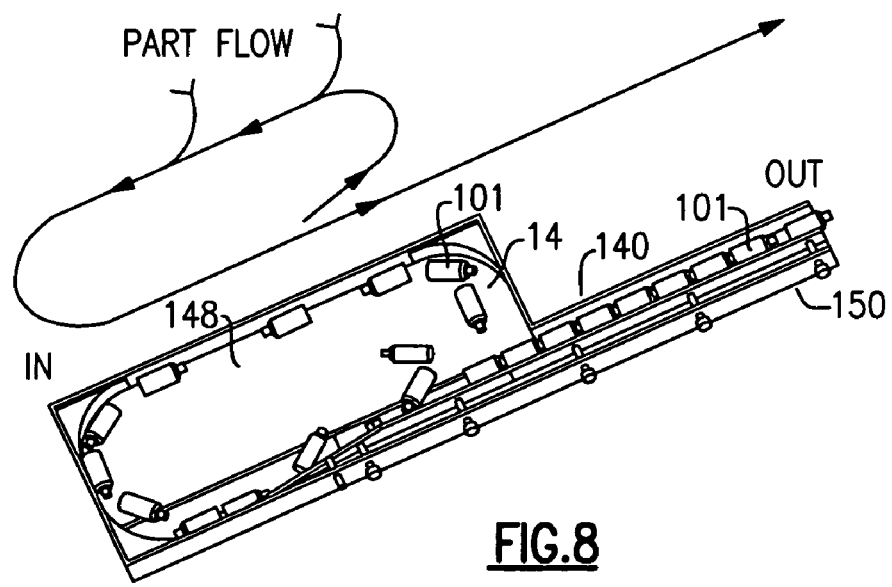
FIG. 8 shows a parts orienter embodying the invention.

FIG. 8 shows one example of a part feeder and orienter, in which articles 101, which may be asymmetrical from one end to the other, can be lined up properly for a successive process step. Here, the articles 101 are loaded into a receptacle area 148, and these articles are moved vibrationally around a perimeter of the receptacle area 148 on a mat of the directional material 14, so as to follow the parts flow pattern indicated. Prior to reaching an outlet portion 150, the articles are adjusted so that they are properly oriented, and any reverse-oriented part is automatically kicked out of line and recycled into the receptacle area. This may be done using an electromagnetic device to push the parts out, under direction of a automatic visual sensor. In some cases, the shape of the parts themselves may lend to a pathway design that automatically orients the parts or articles 101.

Many other advantages, features, and applications of the invention would become apparent to the person of skill in this art, without departing from the overall scope and concept of this invention.

I claim:

1. A linear vibratory conveyor for transporting articles, comprising
    a base plate;
    a substantially rigid trough member disposed in a plane above said base plate;
    linear vibratory drive means imparting a vibratory motion to said trough member in a predetermined direction in the plane of the trough member and without significant component in the direction normal to said plane, the linear drive means including a linear drive bearing supporting the trough member on said plane and permitting limited sliding action only in said predetermined direction; and
    a biased material on said trough member for providing motion to said articles, the material having a predetermined bias direction, and with said bias direction being oriented on said trough in a conveyance direction for transporting said articles,
    wherein said trough member is configured as a plurality of successive rows, with the bias material having its bias direction alternating from each row to the next.

2. The linear vibratory conveyor of claim 1 comprising end pieces of said material at the end of each row having the bias direction thereof oriented laterally and towards the next successive row.

3. A linear vibratory conveyor for transporting articles, comprising
    a base plate;
    a substantially rigid trough member disposed in a plane above said base plate;
    linear vibratory drive means imparting a vibratory motion to said trough member in a predetermined direction in the plane of the trough member and without significant component in the direction normal to said plane, the linear drive means including a linear drive bearing supporting the trough member on said plane and permitting limited sliding action only in said predetermined direction; and
    a biased material on said trough member for providing motion to said articles, the material having a predetermined bias direction, and with said bias direction being oriented on said trough in a conveyance direction for transporting said articles,
    wherein the conveyor is configured as a parts orienter for arranging asymmetrical parts in a given direction, and including means for permitting correctly oriented ones of said parts to exit the conveyor to a successive stage, and means for returning incorrectly oriented ones of said parts back into the conveyor to be re-oriented.

* * * * *